(12) United States Patent
Kilfeather et al.

(10) Patent No.: US 11,740,364 B1
(45) Date of Patent: *Aug. 29, 2023

(54) SYSTEM AND METHOD TO REDUCE PPP FILTER CONVERGENCE TIME USING LEO FREQUENCY BAND SIGNALS

(71) Applicant: Globalstar, Inc., Covington, LA (US)

(72) Inventors: James Kilfeather, Covington, LA (US); Samuel Phillip Pullen, Stanford, CA (US)

(73) Assignee: Globalstar, Inc., Covington, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,471

(22) Filed: Jan. 7, 2022

Related U.S. Application Data (63) Continuation of application No. 16/582,040, filed on Sep. 25, 2019, now Pat. No. 11,226,416.

(60) Provisional application No. 62/904,243, filed on Sep. 23, 2019, provisional application No. 62/752,701, filed on Oct. 30, 2018, provisional application No. 62/736,269, filed on Sep. 25, 2018.

(51) Int. Cl.
　　*G01S 19/31*　　(2010.01)
　　*G01S 19/32*　　(2010.01)
　　*G01S 19/42*　　(2010.01)
　　*G01S 19/25*　　(2010.01)

(52) U.S. Cl.
　　CPC ............ *G01S 19/31* (2013.01); *G01S 19/258* (2013.01); *G01S 19/42* (2013.01)

(58) Field of Classification Search
　　CPC .......... G01S 19/31; G01S 19/32; G01S 19/42; G01S 19/24; G01S 19/258; G01C 15/00; H01Q 1/1257
　　USPC ........................................................ 342/352
　　See application file for complete search history.

(56) References Cited

U.S. PATENT DOCUMENTS

| | | | |
|---|---|---|---|
| 6,373,432 B1 * | 4/2002 | Rabinowitz | H04B 7/18552 |
| | | | 342/357.29 |
| 9,557,422 B1 | 1/2017 | Miller et al. | |
| 2013/0332072 A1 * | 12/2013 | Janky | G01S 19/40 |
| | | | 701/469 |
| 2016/0011318 A1 * | 1/2016 | Cohen | G01S 19/42 |
| | | | 342/357.68 |

OTHER PUBLICATIONS

Walter, Todd, Juan Blanch, and Victoria Kropp. "Satellite selection for multi-constellation SBAS." Proceedings of the 29th International Technical Meeting of the Satellite Division of the Institute of Navigation (ION GNSS+ 2016). 2016.

Abd Rabbou, Mahmoud, and Ahmed El-Rabbany. "PPP accuracy enhancement using GPS/GLONASS Observations in Kinematic mode." Positioning 6.01 (2015): 1.

(Continued)

*Primary Examiner* — Harry K Liu
(74) *Attorney, Agent, or Firm* — Jones Walker LLP (57) ABSTRACT

A method of enhancing the accuracy of a navigation system which includes a GNSS receiver. The method includes receiving navigation signals from at least one GNSS constellation and a LEO constellation. Position estimates will be made through implementation of a filter using successive readings of pseudoranges and carrier-phase measurements from the GNSS constellation and carrier-phase measurements from the LEO constellation.

22 Claims, 6 Drawing Sheets

(56) References Cited

OTHER PUBLICATIONS

Pullen, Sam. "Augmented GNSS: Fundamentals and Keys to Integrity and Continuity" Proceedings of the ION GNSS. 2011. (Part 1—pp. 1-60).

Pullen, Sam. "Augmented GNSS: Fundamentals and Keys to Integrity and Continuity" Proceedings of the ION GNSS. 2011. (Part 2—pp. 61-120).

Rabinowiz, Matthew. "A Differential Carrier-Phase Navigation System Combining GPS with Low Earth Orbit Satellites for Rapid Resolution of Interger Cycle Ambiguities," Dec. 2000, 222 pages.

\* cited by examiner

SYSTEM AND METHOD TO REDUCE PPP FILTER CONVERGENCE TIME USING LEO FREQUENCY BAND SIGNALS

I. CROSS-REFERENCE TO RELATED APPLICATIONS

This application is a continuation of U.S. Non-Provisional application Ser. No. 16/582,040, filed on Sep. 25, 2019, which application claims the benefit under 35 USC § 119(e) of US Provisional Application Nos. 62/904,243 filed Sep. 23, 2019; 62/752,701 filed Oct. 30, 2018; and 62/736,269 filed Sep. 25, 2018, all of which are incorporated by reference herein in their entirety.

II. BACKGROUND

Automobiles and other autonomous platforms such as drones require precise position knowledge with high integrity, for instance, precision in the centimeter range. Typical global navigation satellite systems (GNSS), such as GPS, Galileo, and GLONASS provide positions with accuracies in the range of several meters. GNSS systems by themselves cannot meet the safety requirements of autonomous vehicles. However, augmenting GNSS systems with data derived from ground-based reference networks allows in-vehicle systems to provide sub-meter accuracy and integrity bounds on navigation errors to very low probabilities. When this is combined with other on-board sensors and data such as LIDAR, Radar, Optics, and IMUs, it is possible to operate autonomously under almost all conditions with a very high degree of safety. Thus, techniques which provide rapid and precise position, velocity, and time information are of special interest in the development of autonomous platforms.

III. SUMMARY OF SELECTED EMBODIMENTS OF INVENTION

One embodiment of the present invention is a method of enhancing the accuracy of a navigation system which includes a GNSS receiver. The method includes receiving navigation signals from at least one GNSS constellation and a LEO constellation. Position estimates will be made through implementation of a filter using successive readings of pseudoranges and carrier-phase measurements from the GNSS constellation and carrier-phase measurements from the LEO constellation.

One embodiment will use WADGNSS or PPP data to confirm the integrity of LADGNSS data, and if the integrity is confirmed, utilize the LADGNSS data to correct navigation signals.

Another embodiment will use Receiver Autonomous Integrity Monitoring (RAIM) by first establishing a protection level based on a degree to which each satellite within the set varies from the consensus; and then performing a detection test by determining whether each subset of the satellites varies from the consensus by more than a certain threshold amount.

A further embodiment will have each satellite in the LEO constellation project a signal footprint onto the earth surface, and the LEO satellites will not transmit navigation data and augmentation data for GNSS or LEO satellites not visible within the signal footprint.

Additional embodiments are disclosed in the following Detailed Description.

V. DETAILED DESCRIPTION OF SELECTED EMBODIMENTS

Figure 1:
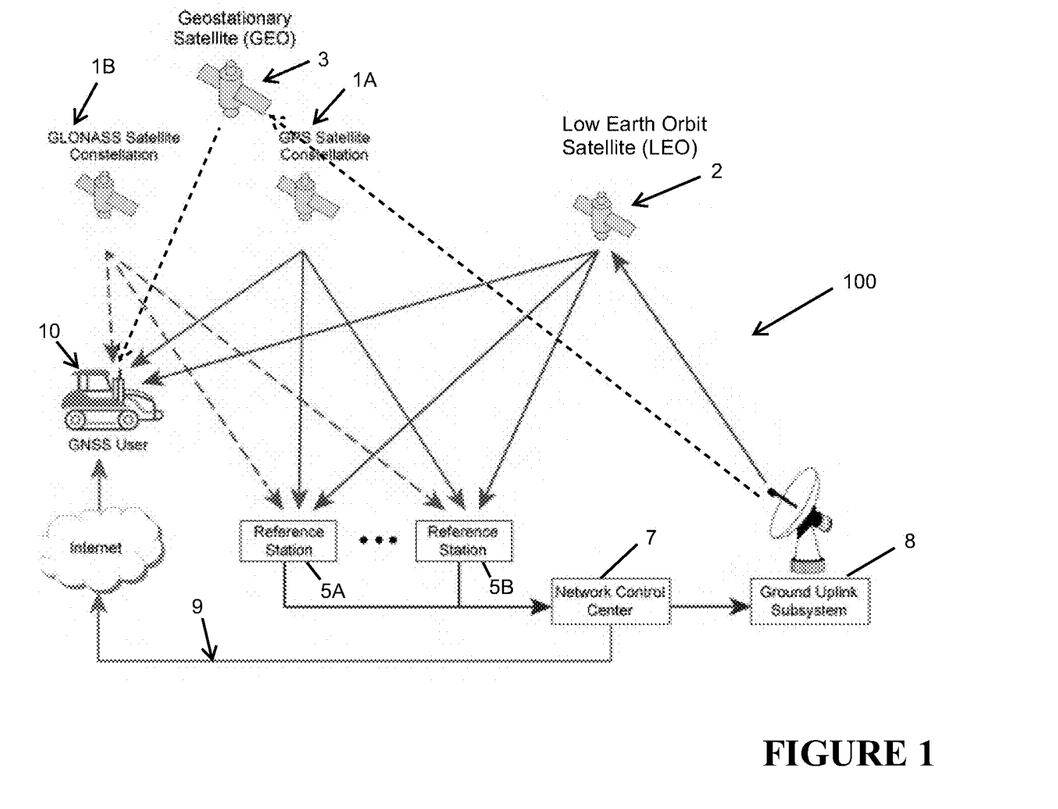
FIG. 1 illustrates one embodiment of a GNSS system contemplated by the present invention.

As suggested above, many embodiments of the invention relate to methods and apparatuses for enhancing the accuracy of a GNSS based or supported navigation system. In the embodiment seen in FIG. 1, the environment in which the navigation system operates typically will include at least one Global Navigation Satellite System (GNSS) satellite constellation 1, a Low Earth Orbit (LEO) constellation 2, A GNSS receiver system 10, one or more terrestrial reference stations 5, a network control center 7, a terrestrial link 9 to GNSS receiver system 10, and one or more ground to satellite uplink 8 communicating with at least the LEO constellation. In many embodiments, the system may include one or more geostationary satellites 3 receiving information from satellite uplinks 8 and transmitting such information to receiver system 10. FIG. 1 shows this environment with two available GNSS systems, GLONASS constellation 1B and GPS constellation 1A.

Examples of current GNSS systems include the GPS, GLONASS, Galileo or BeiDou systems or constellations. Examples of LEO constellations include Globalstar, Iridium, Orbcomm, ECCO, FAISAT, and LEO One. Typically, a LEO satellite is in a geocentric orbit with an altitude from about 160 to 2,000 km, while a Medium Earth Orbit (MEO) ranges in altitude from about 2,000 km to just below a Geosynchronous Orbit (GEO) at an altitude of approximately 35,786 km. When the current description discusses receiving signals or data from a GNSS, LEO, or GEO "satellite constellation" (or simply "constellation"), this means receiving signals or data from at least one satellite, but possibly multiple satellites within the particular constellation. Normally, a terrestrial GNSS receiver will have in view multiple satellites from GNSS constellations, but may have in view only one or two satellites from a LEO constellation or GEO constellation.

GNSS navigation systems typically support position determination with an accuracy of 1-3 meters (one-sigma) in "standalone" mode, without external augmentation. Often, sub-meter positioning accuracy is needed, for instance with navigation of autonomous vehicles. One method of increasing accuracy is to utilize signals from more than one GNSS constellation in the location calculation. Using multiple redundant satellite signals help compensate for the presence of signals that are blocked by local obstructions, have unacceptably high levels of multipath, or otherwise adversely affect position accuracy. However, other methods are available that improve upon the basic GNSS data set in order to provide increased accuracy. Many such methods continuously augment GNSS data by supplying additional information from sources external to the GNSS system. Some sets of such "augmentation data" are delivered by satellite systems, e.g., Satellite Based Augmentation Systems (SBAS), while others are delivered by land-based ("terrestrial") delivery systems (such as cell tower broadcast), e.g., Ground Based Augmentation Systems (GBAS).

Augmentation data can include information about sources of error in the GNSS data (such as clock drift, ephemeris, or ionosphere delay), in order to allow users to correct errors in the GNSS data. Additional data can also be provided to support indirect estimates of GNSS system errors, such as tropospheric delays. Generally, third-party vendors (or governmental bodies) provide augmentation data as a service. Global augmentation data will be transmitted to satellites for broadcast to terrestrial receivers within that satellite's coverage area. The vendor-provided augmentation data set contains information for every satellite in each particular GNSS constellation that can be applied by user receivers, and typically the entire data set is then transmitted for worldwide broadcast by the delivery system.

One type of augmentation data is differential GNSS corrections. Many existing differential GNSS (DGNSS) systems provide corrections to raw GNSS navigation data via satellites to users spread over large areas. One example, the FAA Wide Area Augmentation System (WAAS), broadcasts corrections from GEO satellites and includes corrections for all satellites that are supported by the augmentation system. In WAAS (and other SBAS systems, in general), one limitation is the RTCA Minimum Operational Performance Standards (MOPS) limiting the correction data broadcast message to no more than 51 satellites. Given the very large footprint of GEO satellite broadcasts, all satellites for which corrections can be computed may not be included in GEO satellite broadcasts. The same is generally true for DGNSS systems covering a local area, such as the FAA Local Area Augmentation System (LAAS), or Ground-Based Augmentation Systems (GBAS) in general. In local-area systems, the number of visible satellites needing augmentation data is smaller, but the bandwidth of the correction message is larger. Thus, correction data for all of the relevant satellites may be more difficult to include in the broadcast messages.

Differential GNSS (DGNSS) corrections based on WADGNSS, Real-time Kinematic (RTK), local area differential GNSS (LADGNSS) and on Precise Point Positioning (PPP) are common means of providing GNSS augmentation information or corrections. These techniques remove or model GNSS system errors to provide a higher level of accuracy for the (corrected) GNSS navigation data and may model other local errors, such as tropospheric delays. Augmentation data is generated using networks of global or local reference stations (see reference stations 5 in FIG. 1), where the reference stations have known (pre-surveyed) positions of very high accuracy (within 1-2 cm). DGNSS is achieved by determining the differences between GNSS satellite range measurements made at a reference station and the theoretically calculated ranges to each satellite based on the independently known position of the reference station. These differences (or corrections based on these differences) are then transmitted to end users to allow them to refine the navigation solutions obtained at their locations by updating their own measurements and the raw GNSS navigation data (generally). This is commonly performed using standards maintained by the Radio Technical Commission of Maritime Services (RTCM), RTCA, and others. SBAS systems are regional, providing corrections based on a regional set of reference stations, while PPP corrections are global, as they are based on a global system of reference stations that are used to compute a single correction data stream to be used worldwide.

The generation and use of differential corrections is also an important means to improve upon and ensure the integrity, or safety of use, of GNSS position solutions. When corrections are generated, inconsistent or unusual GNSS satellite or atmospheric behavior can become observable, and if this behavior is potentially hazardous to users, affected satellites can be removed from the broadcast corrections or broadcast with indicators telling users not to apply these satellites or to de-weight them in the position solution. These indicators affect the calculation of protection levels, as described below.

Figure 2:
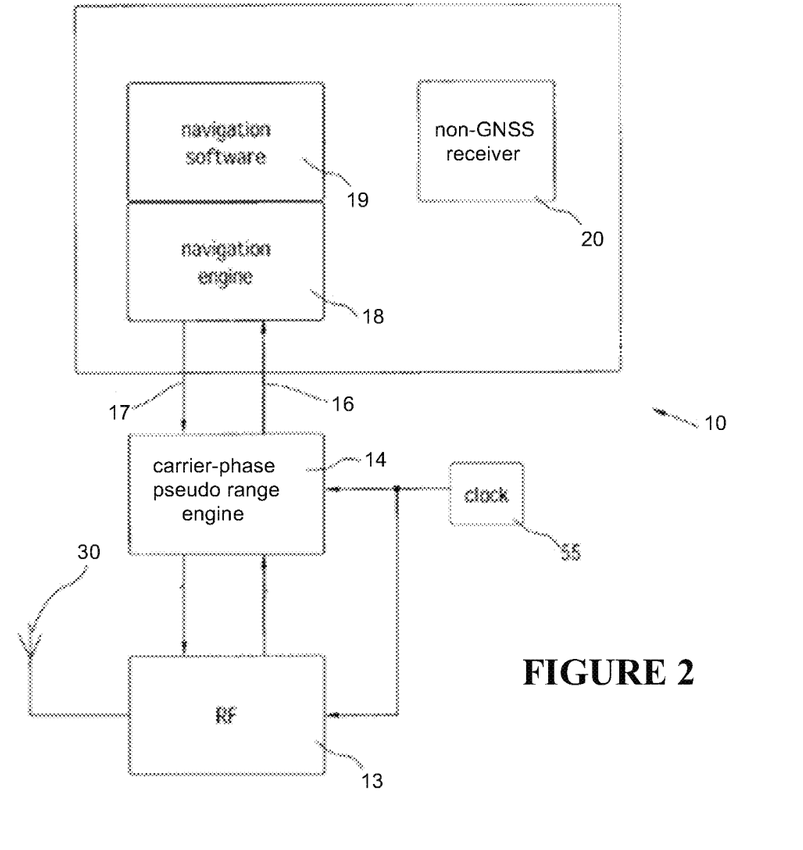
FIG. 2 illustrates one embodiment of a GNSS receiver system.

Certain embodiments of the present invention relate to a navigation system which utilizes a GNSS receiver to receive navigation signals from both a GNSS constellation and a LEO constellation in order to enhance the speed and accuracy of position determinations. As used herein, "GNSS receiver," or more generally "GNSS receiver system," means the hardware and software components for receiving and processing GNSS signals and relate signals. Viewing FIG. 2, a "GNSS receiver" 11 more narrowly defined may referred to an antenna 12 and RF module 13 configured (tuned) to receive navigation signals at frequencies allocated for that purpose (e.g., the L1, L2 bands for GPS or the L5/E5 bands for Galileo). A processor performs the function of a carrier-phase/pseudorange engine which receives navigation data and generates uncorrected or "raw" timing and distance (pseudorange and carrier-phase) measurements. The raw timing and distance measurements are typically further processed by another processor designated in FIG. 2 as navigation engine 18, which among other functions, applies augmentation data to generate corrected distance and position measurements. The navigation software 19 will specify correction routines and filtering applied to the raw measurements. Normally, the augmentation data utilized by the navigation engine 18 will be obtained from the non-GNSS receiver 20. Non-GNSS receiver 20 may be configured to receive transmissions (typically wireless) from many different sources outside the GNSS bands. For example, non-GNSS receiver 20 may be configured to receive non-GNSS satellite data signals (e.g., from LEO or GEO communications satellites), or non-GNSS receiver may be configured to receive data from a terrestrial source such as a cellular network, a wireless hot-spot, or the like. However, not all GNSS receiver systems necessarily have multiple processors and a non-GNSS receiver. It is possible to have a single processor handling all computational tasks and a single receiver collecting GNSS signals and other satellite based data signals (e.g., from LEO and GEO satellites).

As referenced above, there are many sources of augmentation data, including more global geographic augmentation data (e.g., WADGNSS or PPP) and more locally specific augmentation data (e.g., LADGNSS). In one aspect of the invention, navigation systems (e.g., in vehicles) in regions where local corrections are available would receive both global augmentation data (e.g., WADGNSS or PPP from satellites) and local augmentation data (e.g., LADGNSS from cellular links) and compare the two types of augmentation data to determine if, and the degree to which, the local augmentation data is likely to provide the best positioning determinations. Under most circumstances, local augmentation data will provide smaller (superior) protection levels and should be used in place of global data. However, if the corrected measurements implied by the global and local corrections are too different, or two local reference stations produce corrections that are much more different than the separation between these stations would suggest, the possibility of extreme ionospheric or tropospheric decorrelation exists. In those cases, users would fall back to using the global augmentation data, which provides larger protection levels that are more robust to these anomalies. Stated another way, WADGNSS or PPP data is utilized to confirm the integrity of the LADGNSS data, and if the integrity is confirmed, the LADGNSS data is used to correct navigation signals.

Although selection of augmentation data is one factor increasing accuracy of GNSS positioning estimates, other factors local to the receiver may adversely affect positon accuracy, e.g., multipath errors, receiver clock errors, local atmospheric delays not accounted for in the PPP corrections, or carrier-phase integer ambiguities not resolved by PPP corrections. It is known in the art to use various filtering techniques to lessen the impact of these potential errors, with particular examples being a Kalman filter or extended Kalman filter. Thus, another aspect of the present invention is to create a position estimate through implementation of a filter which includes as filter inputs successive readings of (i) pseudoranges and carrier-phase measurements from a GNSS constellation, and (ii) carrier-phase measurements from a LEO constellation.

As known in the art, the Kalman filter is recursive and propagates forward or evolves at each epoch (generally, a measurement cycle or period). At system start up, local varying conditions (states) are estimated, and as measurements progress, the recursive filter refines both the state estimates and confidence in those estimates. The state estimates improve with successive GNSS measurements until they converge to stable and slowly varying values. The typical convergence time of PPP to under ~20 cm horizontal error is between 20 and 40 minutes, but it depends on the number of satellites available, satellite geometry, quality of the correction products, receiver multipath environment, and atmospheric conditions.

However, the use of carrier-phase measurements from LEO constellations can significantly reduce the time required to converge from initial performance (meter-level accuracy) to steady-state performance (centimeter-level accuracy). Although LEO satellite signals may function to transmit GNSS augmentation data for different constellations of GNSS satellites, these signals can also be used as additional ranging sources (or "ranging signals") to improve upon the accuracy and integrity of these dedicated GNSS satellites. The LEO satellite signals can also function to provide a backup source of ranging when some GNSS satellites are unavailable due to RF jamming, spoofing, or other failures that are detected and excluded by the navigation system. Carrier-phase measurements from LEO satellite signals (e.g., Globalstar) may be combined with pseudorange and carrier-phase GNSS (e.g., GPS, GLONASS) measurements to perform local-area Carrier-Phase Differential GNSS (CDGNSS) with improved performance and more-rapid acquisition of carrier-phase integer ambiguities, which can be one key to reducing nominal horizontal errors to 1-2 cm.

Figure 3:
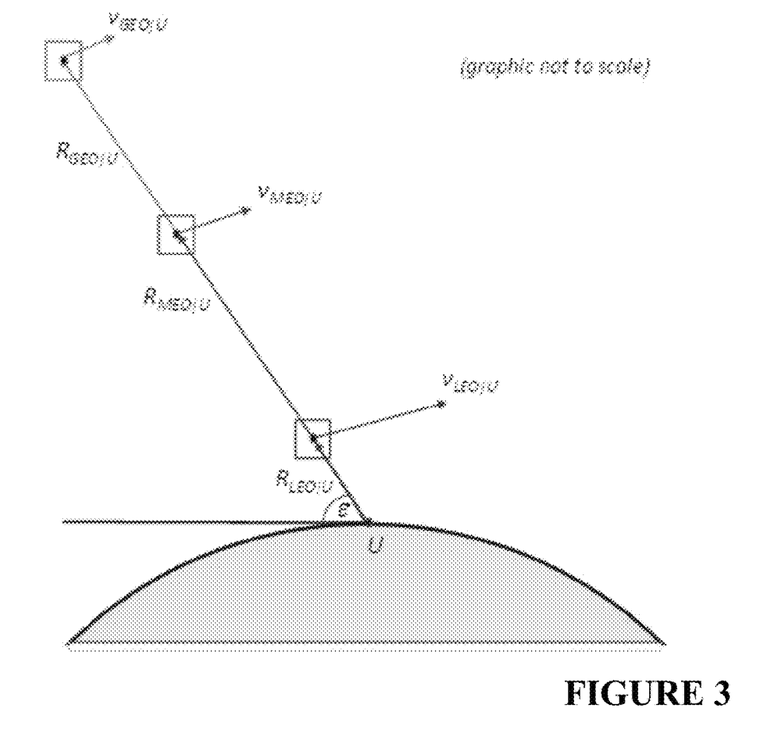
FIG. 3 illustrates different orbital velocities between satellites at different altitudes.

The basis for the improved speed of convergence for the carrier-phase ambiguities is suggested by FIG. 3. FIG. 3 illustrates the different rates of GNSS satellite (typically in MEO) and LEO satellite motion relative to a fixed user location (U) on Earth. The vectors $v_{GEO|U}$, $v_{MEO|U}$, and $v_{LEO|U}$ represent the velocities of GEO, MEO, and LEO satellites, respectively, relative to a fixed user on Earth that sees these satellites at the same elevation angle ($\varepsilon$). Satellites closer to Earth move faster relative to observers on the Earth's surface. The faster relative motion of satellites in LEO causes the line-of-sight vector between it and the user to change more quickly than is the case for GNSS satellites in MEO orbits. As this vector moves, two beneficial effects occur: (1) errors such as multipath and atmospheric delays change and thus are easier to reduce by filtering; and (2) the user's observation geometry changes, making the carrier-phase integer ambiguities (and user position in general) easier to estimate. Because LEO satellites move much faster relative to Earth-based users than GNSS satellites in MEO, this motion helps separate the correct integer ambiguities to the LEO satellite from other more slowly-changing error sources and, it makes the linear-algebra problem of estimating the correct integer ambiguities to the GNSS satellites solvable with very high probabilities in much less time.

Figure 4:
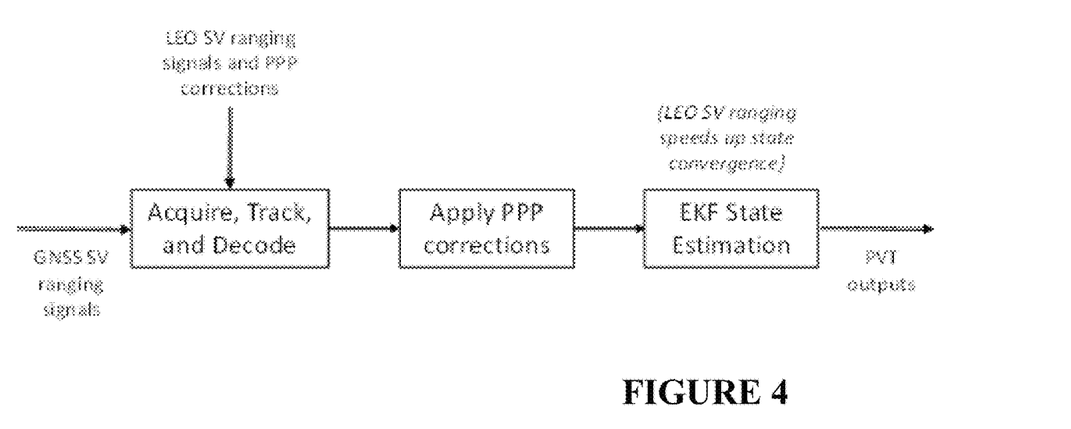
FIG. 4 illustrates a flowchart for processing satellite ranging signals and correction data.

FIG. 4 suggests a summary of the procedure for acquiring satellite based measurements and processing them through a filter. LEO satellite ranging signals are acquired and tracked at the same time as PPP/WADGNSS corrections (transmitted from LEO satellites) and GNSS ranging signals. The corrections are applied as they are updated, and an Extended Kalman Filter (EKF) is used to estimate the user's range and position domain error states and confidence intervals. Protection levels (described below) are computed from the outputs of this EKF, and they diminish as convergence proceeds, allowing more-demanding autonomous-vehicle applications to become more practical.

As discussed above, augmentation data is provided to exclude or otherwise mitigate unusual behavior due to satellite faults or atmospheric anomalies. However, anomalies that occur in the immediate vicinity of a receiver, such as unusual multipath, RF interference, or GNSS spoofing attacks, may need additional mitigation at each individual receiver. One of the more common defenses against local threats to GNSS is known as Receiver Autonomous Integrity Monitoring, or RAIM.

Very generally, RAIM operates by comparing redundant satellite range and position measurements to determine if one or more signals significantly disagree from the consensus of the remainder. If this disagreement is sufficiently large, the affected signals are excluded from use. If not, a measure of this disagreement is included in the protection levels described further below. The basic RAIM concept is not difficult to implement when the number of satellites being tracked is small. However, optimal GNSS performance for many GNSS applications (e.g., autonomous vehicles) is predicated on use of at least two of the multiple GNSS constellations either currently existing (i.e., GPS, GLONASS, Galileo and BeiDou) or being developed for future use. This introduces a large number of possible single-satellite, dual-satellite, and constellation failure modes that must be monitored in real-time by a RAIM method, or more likely, an advanced RAIM (ARAIM) method. Under these conditions, the numerical demands of a conventional ARAIM system can exceed what is supportable by standard vehicle receivers and processors. One potential solution would be a combined method where traditional RAIM residuals tests are used to exclude obvious faults before they need to be evaluated by ARAIM.

Constructing one hypothetical example of applying a RAIM procedure, it will be presumed that a GNSS receiver at a given terrestrial location is able to view 10 GPS satellites (the first GNSS constellation), 5 GLONASS satellites (the second GNSS constellation), and 1 Globalstar satellite (the LEO constellation). The first step in the RAIM procedure will be (i) using as filter inputs satellite measurements from all the satellites within a first set of satellites in order to produce a first filter output. The filter could be an EKF as described above or another conventional or future developed filter. The "first set of satellites" could be all satellites visible (i.e., 10 GPS, 5 GLONASS, and 1 Globalstar), but the first set of satellites could also be a smaller number based upon some initially determined satellite deficiency. For example, if it is presumed that 2 of the GPS satellites and 1 of the GLONASS satellites were technically visible to the GNSS receiver, but their signal strength was too weak to maintain a continuous lock with the receiver, then the first set of satellites may be (and will be for this example) considered 8 GPS, 4 GLONASS, and 1 Globalstar. Thus, measurements from this latter "first" set of satellites will be the filter inputs and provide a first filter output.

The second step in the RAIM procedure will be iteratively removing as filter inputs satellite measurements from a subset of satellites in the first set in order to produce "parallel filter outputs." The "subset" of satellites being removed as filter inputs could be a single satellite (e.g., 1 GPS), two or more satellites from the same constellation (e.g., 2 GLONASS), or two or more from different constellations (e.g., 1 GPS, 1 GLONASS, and the Globalstar). Other examples of subsets could include: (i) all distinct pairs of satellites; (ii) all distinct triplets of satellites; (iii) all satellites of the first GNSS constellation; (iv) all satellites of the first LEO constellation; (v) all satellites of a second or additional GNSS constellations; or (vi) all satellites of a second or additional LEO constellations. For each subset of satellites removed as filter inputs, measurements from the remainder of the first set of satellites would form filter inputs which produce the parallel filter output.

The third step in the RAIM procedure will be excluding satellite measurements whose inclusion in the filter inputs creates a parallel output significantly differing from the first filter output. Thus, if the subset of removed filter inputs is a single GPS satellite, and the remainder of satellites produce a parallel filter output significantly different from the filter output resulting from the first set of satellites, there is a statistical probability that the removed GPS satellite will adversely influence the accuracy of final position, time, or velocity (PVT) measurements if not excluded.

While this RAIM procedure provides one manner of improving final PVT measurements, another embodiment may further refine the RAIM procedure by (i) establishing a protection level (described further below) based on a degree to which each satellite within the set varies from the consensus; and (ii) performing a detection test by determining whether each subset of the satellites varies from the consensus by more than a threshold amount. Additionally, the RAIM method may be extended by (iii) excluding (from final PVT calculations) measurements from satellite subsets which fail the detection test.

Protection levels under nominal conditions are usually generated by extrapolating nominal error models to the very small probabilities that need to be protected. Because nominal error behavior at these low probabilities is not as well understood, these models must be more conservative than those that bound nominal errors at 95% or 99% levels (see the discussion of FIG. 5 below). Protection levels under specific fault conditions ("hypotheses") are then generated by summing estimates of the fault magnitude with nominal error bounds so that the entire probability for which a protection-level bound is required (the probability of the fault plus the remaining probability of rare-event nominal errors) is covered.

Advanced RAIM (based on solution-separation approaches to RAIM) can generate a faulted protection level for each subset of the set of visible and usable satellites. In an example with 10 usable GPS satellites, computing a position solution based on all 10 satellites represents the "consensus" solution. If one of the 10 satellites is removed, and the position is recomputed using the remaining 9 satellites, the difference between the original consensus position and this "subset" position represents the estimate of fault magnitude if the removed satellite were actually faulty (because the hypothetically faulty satellite is absent from the subset). This can be repeated individually for all 10 satellites, for all distinct pairs of satellites, and so on to determine the fault magnitude estimate for any hypothesized combination of satellite or measurement faults.

The estimates of fault magnitude derived to support protection-level calculations can also be used to detect and exclude measurements that are likely to be faulty. If the fault-magnitude estimate exceeds a configurable threshold (typically established as several standard deviations of the nominal error model), detection of a potential fault would occur due to the fact that this degree of variation from the consensus solution has a significant likelihood of being due to a fault (as opposed to an unusual example of nominal error). The particular subsets of satellites whose fault magnitude generates detections could then be excluded from use, allowing RAIM to re-generate the fault magnitude estimates and corresponding protection levels for the new consensus solution (after the excluded satellites are removed).

Moreover, now that signals from multiple GNSS constellations are available, it is possible to be more aggressive in removing questionable signals while retaining enough high-quality signals to achieve the desired accuracy. However, GNSS integrity monitoring can have significant statistical uncertainty; thus signals that pass all monitoring steps still contain some risk of producing large errors. For this reason, a protection level concept can be devised to inform users of the degree of residual risk of large position errors after integrity monitoring is completed.

Figure 5:
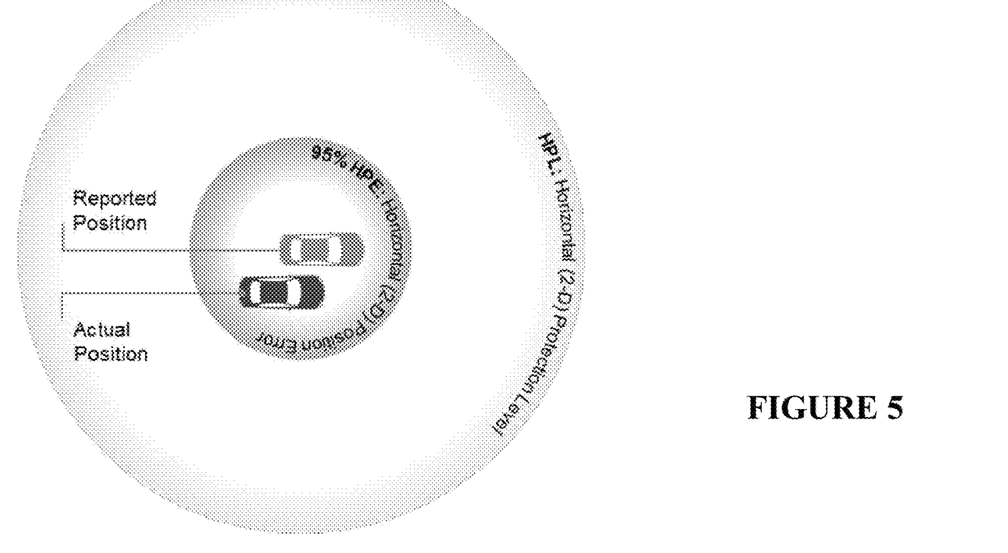
FIG. 5 illustrates examples of horizontal position errors and protection levels.

FIG. 5 suggests how protection levels are defined and interpreted by users. The user vehicle in the center of the figure obtains a reported position at each epoch (e.g., at 1 to 10 Hz) which has some unknown error on it. A typical (but unknown) actual vehicle position is also shown for illustration purposes. The inner, darker circle is centered at the reported (most likely) position and represents computed bounds on 95% horizontal position error (HPE). Since nominal error conditions apply at least 95% of the time, the dimensions of the circle can be derived directly from models of nominal errors, which usually are expressed by Gaussian distributions with zero mean and a pre-established standard deviation (or "sigma"). Nominal errors are those that are caused by typical measurement conditions, as opposed to equipment failures or environmental anomalies, and are therefore relatively easy to model. It should also be noted that circular shapes are shown for 2-D error in FIG. 5. If 1-D errors are estimated separately, the resulting 2-D error shapes will be elliptical in general.

The lighter circle in FIG. 5 is much larger and represents the horizontal protection level or HPL, around the reported user position. Unlike 95% HPE, which is a bound on accuracy under typical conditions, HPL provides a bound on HPE out to a very small probability that depends on the safety requirements of the application being conducted. This probability is often $10^{-7}$ or lower per epoch or per longer interval that corresponds to a typical period of operations. Because a probability this small requires consideration of failures and other off-nominal conditions, the calculation of protection levels is much more complex than the calculation of 95% error bounds.

Figure 6:
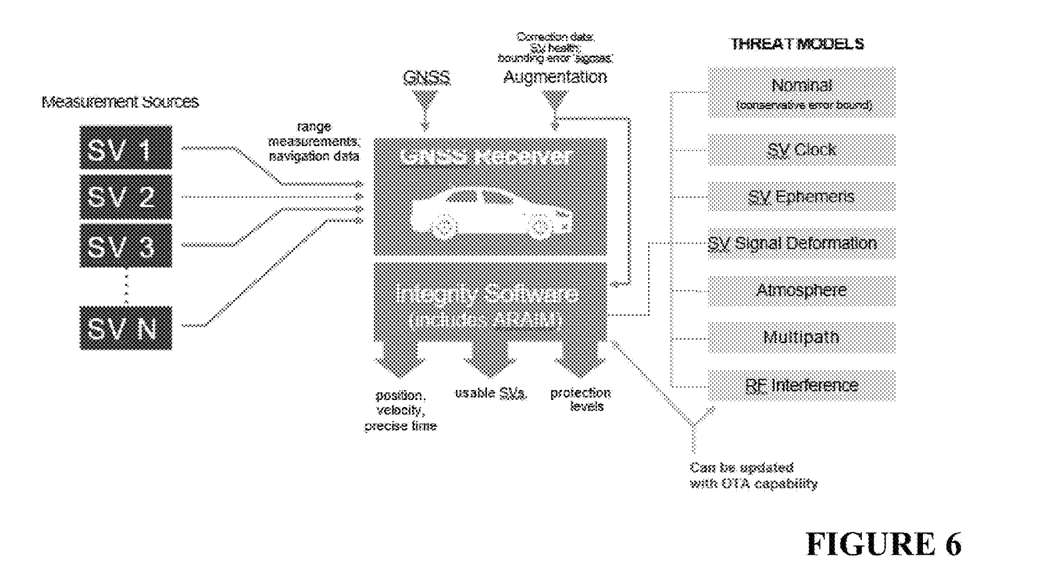
FIG. 6 illustrates elements of real-time integrity monitoring and protection level calculations.

FIG. 6 shows the elements that could be included in the performance of integrity monitoring and the calculation of protection levels by vehicles applying augmented GNSS. "Threat models" of potentially faulted behavior of the satellite signals ("measurement sources") and vulnerabilities of the augmentation systems are created as part of system safety verification and are shown on the right-hand-side of the figure. The "nominal" threat model assumes that nominal conditions exist out to the probability to be bounded. This allows the nominal protection level to be generated by extrapolating the model used to compute 95% accuracy out to the probability called for by the nominal PL. When this calculation is performed, larger ("inflated") error sigmas are typically used because sigmas that are valid at the 95% level are not conservative enough to bound all nominal conditions down to the low probabilities required for protection levels. The other threat models each assume the presence of a particular type of fault or anomaly. Their protection levels start with a bias representing the worst undetected impact of this fault (following the integrity monitoring steps included within measurement processing), de-weighted by a prior probability of this fault occurring, plus a component of nominal error (from the nominal threat model) to cover the "gap" in probability between the fault prior probability and the probability to be bounded.

In principle, a separate protection-level calculation exists for each defined threat model, but in practice, the maximum protection level (and thus the one that governs user behavior) can only be produced by a small subset of these threats, and only these threats need to be evaluated by users. In the case of vehicles using the augmentation methods described herein, the threats most likely to drive these protection levels are local multipath or ionospheric decorrelation. Elements of the threat models shown to the right in FIG. 6 can and will change over time. For example, as new GNSS satellites are launched or as older satellites degrade in performance, a key feature of incorporating LEO communication satellites is the ability to update vehicle software "Over the Air" (OTA). This can also be used to update the GNSS processing software with new threat information and algorithms. This capability satisfies the need for "Integrity Support Message" or "ISM" updates to ARAIM parameters in aviation use. Protection levels can be calculated in real-time in this manner and will be provided to the vehicle guidance controller at a 1 Hz rate or faster. Safety is insured by comparing each protection level to the alert limit that defines the outer limit of safe navigation performance for the operation being conducted, thus multiple protection levels in different dimensions and for applications with different required hazard rates may be provided. If any protection level exceeds its corresponding alert limit, safety is compromised, and some reversionary action must take place to protect the vehicle.

Variations in real-time protection levels are due to a variety of factors. One is the initialization time needed for vehicles using differential corrections, both in terms of initial satellite acquisition and filtering the resulting satellite measurements until steady-state accuracy is obtained. Models of this convergence procedure are included in the protection level calculations so that the results show the steady improvement of accuracy and integrity (and thus enhanced vehicle capability) from initial start-up to full convergence. Changes in the visible set of GNSS satellites, and measurable changes in the quality of the satellite measurements and the differential corrections, are also automatically accounted for.

Figure 7:
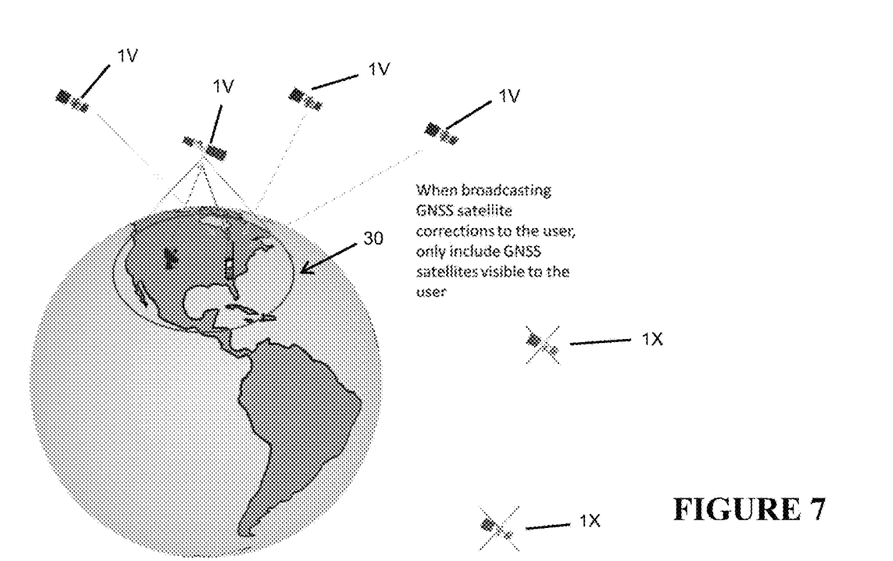
FIG. 7 illustrates a signal footprint of an orbiting satellite.

As implied previously, the efficiency of a navigation system can be enhanced by transmitting only augmentation data which is relevant to the geographical area where the GNSS receiver is currently located. This concept may be visualized in reference to FIG. 7. This figure shows the "footprint" 30 or region on the Earth's surface where he LEO satellite 2 is visible to receivers. GNSS users inside that footprint can only observe a limited number of GNSS satellites 1V any given time based on the known locations of these satellites. The satellites 1X are outside the visibility of the receiver. While the ground system that generates PPP or WADGNSS corrections will operate globally, it will limit the corrections broadcast by the LEO satellite 2 to the subset of GNSS satellites that are visible within its footprint 30. As a result, different LEO satellites will broadcast corrections for different subsets of the GNSS satellites at the same time. This measure alone may reduce the number of satellites for which corrections are provided by a single LEO satellite (at any given time) by 50 to 60% compared to providing corrections for all satellites through each LEO satellite. Stated differently, each satellite in the LEO constellation projects a signal footprint onto the earth surface, and the LEO satellites do not transmit navigation data and augmentation data for GNSS (or LEO) satellites not visible within the signal footprint.

Figure 8:
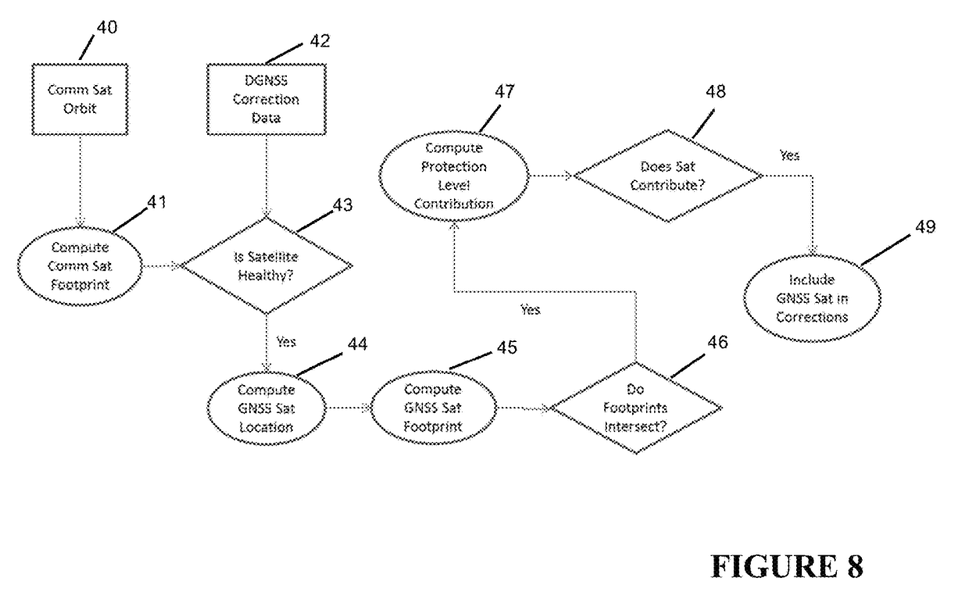
FIG. 8 illustrates a flowchart of one correction data reduction procedure.

The flow chart in FIG. 8 shows one example of an optimization procedure conducted by the PPP/WADGNSS provider system to reduce the number of satellites for which corrections need to be broadcast. In step 40, the orbital position of the communications (e.g., LEO) satellite is determined. This in turn allows in step 41 the calculation of the satellite's footprint on the Earth's surface. In step 43, a check for satellite health is made. Invalid satellite health can be indicated by the signals or navigation of the affected satellites themselves, or it can be determined from the ground system processing that generates PPP or WADGNSS corrections. Poorly-performing GNSS satellites that are not excluded as unhealthy are likely to be assigned larger error bounds (URAs) that will cause them to be de-weighted in the final optimization step. Next, for each GNSS satellite, the satellite location is determined (step 44) and then the GNSS satellite footprint is calculated (step 45). GNSS satellites whose footprints intersect or overlap with the footprint of the given LEO satellite (step 46) are tentatively set to be broadcast, but before the final set of broadcast satellites is determined, the protection level contribution of each overlapping satellite to user position accuracy and protection levels is evaluated (steps 47 and 48). Satellites in redundant locations in the sky (e.g., close to other satellites), or satellites with inflated URAs, may be dropped at this stage, while satellites contributing significantly to the protection level are included in the set for which augmentation data is transmitted (step 49). This process gives another significant reduction in the required message rate (note that being dropped from the corrections broadcast by a given LEO satellite is much different than being excluded from use, as other LEO satellites may broadcast corrections for these satellites). For example, if a total of 16 GPS, 2 QZSS, 11 GLONASS, 11 Galileo, and 10 Beidou satellites (50 in total) are visible within a particular LEO satellite footprint, at least 10 of these (or 20%) are likely to provide little contribution to user performance and need not be included in the broadcast corrections. For LADGNSS corrections generated and broadcast from local ground stations, the concept of overlapping footprints does not apply because all satellites visible to the ground station are likely to be visible to nearby users. However, the same procedure for removing satellites that provide little contribution to positioning accuracy and protection levels applies.

Further optimization steps may be conducted to remove corrections from GNSS satellites that, while being inside the communication satellite footprint, are in geometrically poor locations relative to the users within that footprint, meaning that those users would benefit little from receiving corrections from such satellites. Viewing FIG. 9, one exemplary method for performing this optimization step is to calculate estimates of user position-domain protection levels for four hypothetical user locations near the edges of the LEO satellite footprint determined in a previous step. First, using known techniques, protection levels (PLs) and more specific to the current figures, horizontal protection levels (HPLs), for each of the four selected user locations are computed. These user locations are typically at the North, South, East, and West inside edges of the signal footprint perimeter. This procedure assumes that (a) all GNSS satellites not yet culled from the augmentation data are available for positioning, and (b) all GNSS satellites above 5 degrees elevation (this mask angle is a configurable parameter) at each user location are applied to position determination. Then, each GNSS satellite among those not yet culled from the augmentation data is removed as a trial, and the HPLs for each of the four selected user locations are re-computed. If, for all four user locations, the difference in HPLs before and after removal of a given satellite is below a configurable threshold, and the absolute value of HPL after removal is below a second configurable threshold, the removed satellite is culled from the augmentation data for the LEO satellite in question (because it provides little benefit in terms of reducing HPL over most of the LEO satellite footprint).

Figure 9:
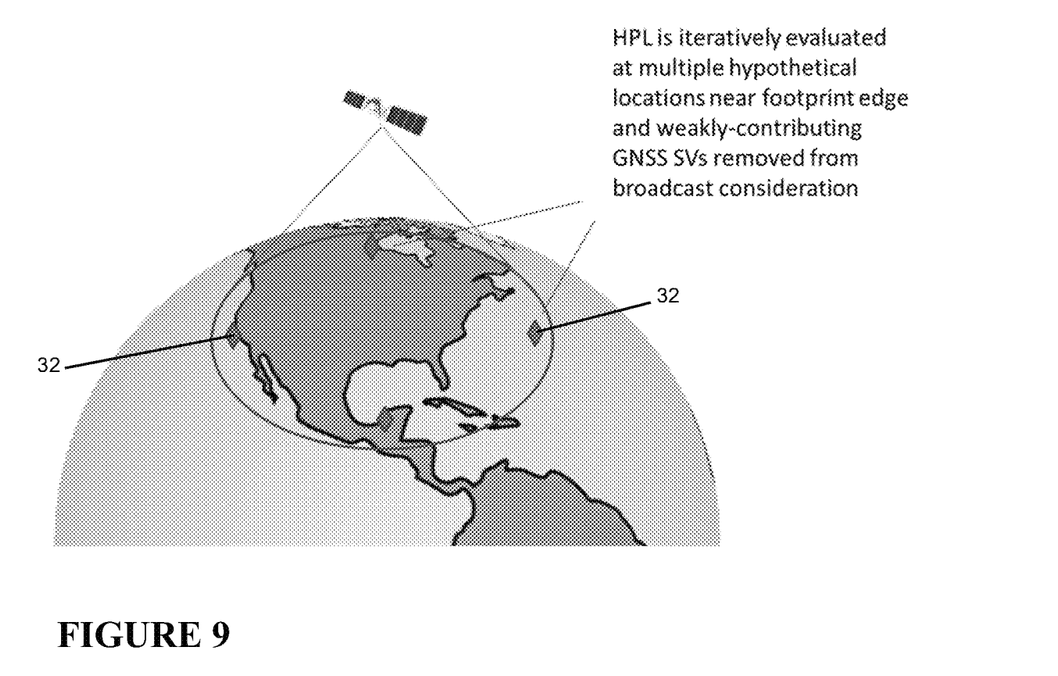
FIG. 9 illustrates horizontal protection level evaluation at a signal footprint edge.

This process of trial GNSS satellite removals continues until all individual GNSS satellites have been trial-removed or until an allocated amount of processing time has elapsed. Because this procedure is processor-time-intensive, it can be updated at a much slower rate than the update rate of the broadcast augmentation data itself (e.g., every minute as opposed to every second). In addition, geometric constraints on GNSS satellite removals (such as not removing satellites above 30 degrees elevation) can be added to make this procedure more efficient. Once the final set of "overlapped" GNSS satellites are determined for a given LEO satellite, the augmentation data for only those GNSS satellites are transmitted to that LEO satellite for rebroadcast.

This optimization procedure described in reference to FIG. 9 may be summarized as (i) calculating protection levels for at least four users positioned at an approximate inside edge of the signal footprint utilizing an initial set of satellites visible to the users; (ii) treating each satellite in the initial set as a trial satellite, wherein the protection levels for the at least four users are re-calculated with the trial satellite removed from the initial set; and (iii) selecting an updated set of satellites by eliminating the trial satellites whose removal from the initial set in step (ii) does not significantly degrade the protection levels of the users.

As used herein, the term "about" will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or even possibly as much as +/−20%. Similarly, "substantially" will typically mean at least 85% to 99% of the characteristic modified by the term. For example, "substantially all" will mean at least 85%, at least 90%, or at least 95%, etc. Additionally, the following publications are incorporated by reference herein in their entirety:

1. Matthew Rabinowitz, A Differential Carrier-Phase Navigation System Combining GPS with Low-Earth-Orbit Satellites for Rapid Resolution of Integer Cycle Ambiguities. Ph.D. Dissertation, Stanford University, Dept. of Electrical Engineering, December 2000 (UMI No. 3000087, 2001). http://web.stanford.edu/group/scpnt/gpslab/pubs/theses/MatthewRabinowitzThesis01.pdf.
2. Todd Walter, Juan Blanch, Victoria Kropp, "Satellite Selection for Multi-Constellation SBAS," Proc. of ION GNSS+ 2016, Portland, Oreg., Sep. 12-16, 2016, pp. 1350-1359. http://web.stanford.edu/group/scpnt/gpslab/pubs/papers/Walter_IONGNSS_2016_SatSelection.pdf.
3. M. A. Rabbou and A. El-Rabbany, "PPP Accuracy Enhancement Using GPS/GLONASS Observations in Kinematic Mode," Positioning, 6, 1-6, Feb. 2015.
4. Sam Pullen, "Augmented GNSS: Fundamentals and Keys to Integrity and Continuity," Tutorial Presentation, ION GNSS 2011, Portland, Oreg., Sep. 20, 2011. http://goo.gl/G6i1Sj.

The invention claimed is:

1. A method of enhancing accuracy of a navigation system including a GNSS receiver, the method comprising the steps of:
   (a) receiving navigation signals from at least (i) a first GNSS constellation, and (ii) a first LEO constellation;
   (b) receiving augmentation data signals from at least one of (i) the first LEO constellation, (ii) a GEO constellation, or (iii) a terrestrial source, wherein the augmentation data includes at least one of (i) wide-area differential GNSS (WADGNSS) data, (ii) Precise Point Positioning (PPP) data, (iii) local-area differential GNSS (LADGNSS) data, or (iv) Real Time Kinematic (RTK) data;
   (c) utilizing (1) WADGNSS and/or PPP data to confirm the integrity of (2) the LADGNSS data and/or RTK data, and if the integrity is confirmed, utilizing the LADGNSS data and/or RTK data to correct navigation signals and generate protection levels;
   (d) creating at least one position estimate through implementation of a filter using as filter inputs successive readings of at least (i) pseudoranges and carrier-phase measurements from the GNSS constellation, and (ii) carrier-phase measurements from the LEO constellation;
   (e) performing Receiver Autonomous Integrity Monitoring (RAIM) by:
      (i) using as filter inputs satellite measurements from all satellites within a first set of satellites in order to produce a first filter output,
      (ii) iteratively removing as filter inputs satellite measurements from a subset of satellites in the first set in order to produce parallel filter outputs, and
      (iii) excluding satellite measurements whose inclusion in the filter inputs creates a parallel output significantly differing from the first filter output.

2. The method of claim 1, wherein the RAIM is performed by:
   (i) establishing a protection level based on a degree to which each satellite within the set varies from the consensus; and (ii) performing a detection test by determining whether each subset of the satellites varies from the consensus by more than a threshold amount.

3. The method of claim 2, wherein the RAIM is performed by the further step of (iii) excluding measurements from satellite subsets which fail the detection test.

4. The method of claim 1, wherein pseudoranges are obtained from the LEO constellation and form inputs to the filter.

5. The method of claim 1, wherein the filter is a Kalman filter.

6. The method of claim 1, wherein the first set of satellites includes satellites of both the first GNSS constellation and the first LEO constellation.

7. The method of claim 1, wherein the first set of satellites includes only satellites of the first GNSS constellation or only satellites of the first LEO constellation.

8. The method of claim 6, wherein RAIM is performed by additionally comparing range and/or position measurements between at least the following subsets of satellites and the remainder of satellites within the first set of satellites:
(i) all distinct pairs of satellites;
(ii) all distinct triplets of satellites;
(iii) all satellites of the first GNSS constellation;
(iv) all satellites of the first LEO constellation;
(v) all satellites of a second or additional GNSS constellations; or
(vi) all satellites of a second or additional LEO constellations.

9. The method of claim 1, wherein the solution based on the excluded measurements varies by at least two standard deviations of nominal error from the solution based on all measurements from the solution based on all measurements.

10. The method of claim 9, wherein the measurements excluded vary by at least five standard deviations of nominal error.

11. The method of claim 1, further comprising receiving navigation signals from a second GNSS constellation and inputting measurements from the second GNSS constellation into the filter.

12. The method of claim 1, wherein (i) a first level of RAIM is applied to range and position measurements to exclude measurements having a first greater deviation from the consensus based upon all measurements, and (ii) a second level of advanced RAIM is applied to range and position measurements to exclude measurements having a second and lesser deviation from the consensus based upon all measurements.

13. The method of claim 1, wherein the navigation system includes:
(i) a first processor configured to output unaugmented measurements including pseudorange measurements and carrier phase measurements, and navigation data; and
(ii) a second processor configured to apply augmentation data to raw measurements and navigation data, implement the filter, and determine position and velocity measurements.

14. The method of claim 1, further including the step of accessing a map database, generating multipath error correction data based upon map information corresponding to a position determined by the GNSS receiver, and updating the GNSS receiver position based upon the resulting multipath correction.

15. The method of claim 1, wherein each satellite in the LEO constellation projects a signal footprint onto the earth surface, and the LEO satellites do not transmit navigation data and augmentation data for GNSS or LEO satellites not visible within the signal footprint.

16. The method of claim 15, wherein the LEO satellites do not transmit navigation data or augmentation data for a GNSS or LEO satellite if the increased position reliability provided by measurements from that satellite is below a contribution threshold.

17. The method of claim 16, further comprising the steps of:
(i) calculating protection levels for at least four users positioned at an approximate inside edge of the signal footprint utilizing an initial set of satellites visible to the users;
(ii) treating each satellite in the initial set as a trial satellite, wherein the protection levels for the at least four users are re-calculated with the trial satellite removed from the initial set;
(iii) selecting an updated set of satellites by eliminating the trial satellites whose removal from the initial set in step (ii) does not significantly degrade the protection levels of the users.

18. An autonomous automobile control system including a navigation sub-system, where in the navigation sub-system comprises:
(a) a GNSS receiver configured to receive navigation signals from at least (i) a first GNSS constellation, and (ii) a first LEO constellation;
(b) a receiver configured to receive augmentation data signals from a terrestrial source; and
(c) at least one processor configured to:
(i) create at least one position estimate through implementation of a filter using as filter inputs successive readings of at least (1) pseudorange and carrier-phase measurements from the GNSS constellation, and (2) carrier-phase measurements from the LEO constellation;
(ii) performing Receiver Autonomous Integrity Monitoring (RAIM) by: (1) using as filter inputs satellite measurements from all satellites within a first set of satellites in order to produce a first filter output, (2) iteratively removing as filter inputs satellite measurements from a subset of satellites in the first set in order to produce parallel filter outputs, (3) excluding satellite measurements whose inclusion in the filter inputs creates a parallel output significantly differing from the first filter output; and
(iii) utilize (1) WADGNSS and/or PPP data to confirm the integrity of (2) local-area differential GNSS (LADGNSS) data, and/or RTK data, and if the integrity is confirmed, utilizing the LADGNSS data and/or RTK data to correct navigation signals and generate protection levels.

19. The autonomous automobile control system of claim 18, wherein the filter is a Kalman filter.

20. The autonomous automobile control system of claim 18, wherein the receiver configured to receive augmentation data signals from a terrestrial source is a cellular receiver.

21. A method of enhancing accuracy of a navigation system including a GNSS receiver, the method comprising the steps of:
(a) receiving navigation signals from at least (i) a first GNSS constellation, and (ii) a first LEO constellation;
(b) receiving augmentation data signals from the first LEO constellation, wherein the augmentation data includes either wide-area differential GNSS (WADGNSS) data or Precise Point Positioning (PPP) data;

(c) creating at least one position estimate through implementation of a filter using as filter inputs successive readings of at least (i) pseudoranges and carrier-phase measurements from the GNSS constellation, and (ii) carrier-phase measurements from the LEO constellation;

(d) performing Receiver Autonomous Integrity Monitoring (RAIM) by:

(i) using as filter inputs satellite measurements from all satellites within a first set of satellites in order to produce a first filter output, (ii) iteratively removing as filter inputs satellite measurements from a subset of satellites in the first set in order to produce parallel filter outputs, (iii) excluding satellite measurements whose inclusion in the filter inputs creates a parallel output significantly differing from the first filter output.

22. The autonomous automobile control system of claim 18, wherein the processor is further configured to access a map database, generate multipath error correction data based upon map information corresponding to a position determined by the GNSS receiver, and update the GNSS receiver position based upon the resulting multipath correction.

\* \* \* \* \*